3,062,841
EPOXIDATION OF ALPHA,BETA ETHYLENIC KETONES WITH ORGANIC HYDROPEROXIDES

Nien-chu C. Yang and Richard A. Finnegan, Chicago, Ill., assignors to Shell Oil Company, New York, N.Y., a corporation of Delaware
No Drawing. Filed Sept. 18, 1958, Ser. No. 761,695
8 Claims. (Cl. 260—348.5)

This invention relates to the production of epoxy-substituted ketones and deals with a new and advantageous method for producing such compounds by epoxidizing the corresponding alpha,beta-ethylenic ketones.

Weitz and Schaffer have described in Berichte, vol. 54B, pages 2327–40 (1921), a method for epoxidizing alpha,beta-ethylenic ketones by reaction with hydrogen peroxide in an alkaline aqueous medium. Wilder and Dolnick have claimed in U.S. Patent 2,431,718 an improvement on that method through the use of a small amount of a water-soluble alkaline earth metal salt. However, such epoxidations with hydrogen peroxide have a number of disadvantages. Thus, for instance, hydrogen peroxide is commercially available only as aqueous peroxide so the epoxidation cannot be carried out readily under anhydrous conditions as is desirable where it is important to minimize hydration of the epoxyketone product. Another disadvantage of epoxidation with hydrogen peroxide is that not only is it generally impractical to recover any excess peroxide remaining after the reaction, but also it is usually undesirable to use a large excess of hydrogen peroxide because of its tendency to cause detrimental oxidation.

The present invention provides a commercially available method for avoiding the foregoing disadvantages of epoxidizing with hydrogen peroxides. It is based on the discovery that alpha-beta-ethylenic ketones can be successfully epoxidized by reaction with an organic hydroperoxide under controlled conditions of alkalinity. This is quite unexpected since hydroperoxides have been shown to add to the double bond of other types of alpha-beta-ethylenic compound, the product being a substituted organic peroxide instead of an epoxide. The new reaction is in marked contrast to that of the percarboxylic acids such as peracetic, perbenzoic and like acids widely used in epoxidation reactions but which react too slowly, if at all, with alpha,beta-ethylenic ketones to be useful in the production of alpha,beta-epoxyketones.

In accordance with the invention alpha,beta-ethylenic ketones are epoxidized by reaction with an organic hydroperoxide in the presence of a base and the resulting alpha,beta-epoxyketone is recovered. By this new method the epoxidation of alpha,beta-ethylenic ketones can be carried out conveniently in a completely homogeneous, non-polar medium with yields of epoxide which compare favorably with those obtained by the previously known methods.

A mole of organic hydroperoxide is required in the reaction for each mole of epoxyketone produced but the alpha,beta-ethylenic ketone and organic hydroperoxide epoxidizing agent can be used in a wide variety of proportions. Most preferably a stoichiometric excess of one of these reactants is employed in order to promote complete reaction of the other reactant at a faster rate. With alpha,beta-ethylenic ketones which are liable to loss through polymerization and other side reactions, an excess of a stable organic peroxide is advantageous because recovery and recycling of the excess reactant is more easily accomplished. When the organic hydroperoxide chosen as epoxidizing agent is one which is more subject to side reactions than the starting alpha,beta-ethylenic ketone, it is preferable to employ a molecular excess of the ketone in the reactions. As a general rule the mole ratio of alpha,beta-ethylenic ketone to organic hydroperoxide which will be used will be in the range of about 0.25:1 to about 4:1, ordinarily between about 0.5:1 and about 2:1 and more preferably between about 0.7:1 and about 1.5:1.

It is usually advantageous to carry out the epoxidation in a liquid medium which serves as a mutual solvent for the ethylenic ketone and organic hydroperoxide being used. A desirable reduction in the concentration of the reactants is thus obtained which tends to reduce undesirable side reactions. While aqueous media can be used as the diluent, there are advantages, as previously mentioned, in operation under anhydrous or substantially anhydrous conditions. Especially when epoxidizing an alpha,beta-ethylenic ketone of low solubility in water, an organic solvent for the reactants is useful instead of or together with water. Hydrocarbon solvents are one useful type of solvent, especially aromatic hydrocarbon solvents such as benzene, toluene and the xylenes and the like, although aliphatic hydrocarbon solvents such as pentane, hexane, cyclohexane, etc. can be used. Alcohols, particularly the water-soluble alcohols, are another group of solvents which are useful, especially the less reactive tertiary alcohols such, for instance, as tertiary butyl alcohol and the like, although other alcohols such as methanol, ethanol, isopropanol, isobutyl alcohol, allyl alcohol, methallyl alcohol, etc. can also be used. Polyhydric alcohols, for instance, ethylene glycol, 2-methyl-2,4-pentanediol, etc. can be similarly used, as can other non-acidic solvents such as ketones, ethers, esters and the like, for example, acetone, methyl ethyl ketone, cyclohexanone, diacetone alcohol, dimethyl ether, ethylene glycol monomethyl ether, ethylene glycol monoacetate, dioxane, etc. Non-reactive solvents, most preferably those which are free from polymerizable ethylenic linkages, are most advantageous. The best results are usually obtained when the reaction is carried out with amounts of liquid solvent or diluent such that the concentration of the reactants in the liquid mixture is not more than about 50% by weight and more preferably is not greater than about 30%.

The reaction can be carried out in the presence of either an organic or an inorganic base. Both soluble and insoluble basic agents are effective. Because of their ready availability at low cost, basic inorganic compounds are generally advantageous. Suitable bases of this kind are, for instance, inorganic hydroxides, examples of which are the alkali and alkaline earth hydroxides such as sodium hydroxide, potassium hydroxide, ammonium hydroxide, magnesium hydroxide, calcium hydroxide, etc.; the corresponding oxides, for instance, sodium oxide, calcium or magnesium oxide and the like; and basic salts such as the water-soluble carbonates, bicarbonates, phosphates and the like; such, for instance, as sodium carbonate or bicarbonate, tripotassium phosphate, etc. Among the organic bases which can be used, although generally they are less to be preferred because of their higher cost, are, for instance, quaternary ammonium bases such as benzyl trimethyl ammonium hydroxide, and the like, salts of phenols such as potassium and calcium phenates, sodium metamethyl phenoxide, sodium napthoxide, etc. There are operating advantages sometimes in using an insoluble form of basic compound. Anion exchange resins, especially quaternary ammonium base resins, are a particularly convenient form of insoluble base for use in the new process. Examples of suitable base resins are, for instance, the amination products of chloromethylated styrene-divinylbenzene copolymers described in U.S. 2,591,-573 and sold by Rohm and Haas as "Amberlite IRA–400" and "IRA–401"; resins made by reacting formaldehyde, melamine and diethylenetriamine in accordance with the process of U.S. 2,388,235 and those sold by Dow Chemical Company as "Dowex 1" which is a quaternary ammonium type ion exchange resin having the quaternary ammonium groups linked to a polystyrene which has been cross linked with divinyl benzene as described in the bulletin of the Dow Chemical Company entitled, "Dowex Ion Exchange Resins," and the like. These may be used in the free base form or in the form of the salts, for instance the carbonate salts of the strong base resins.

In general, the rate of reaction increases as the pH of the mixture is increased. A pH of at least about 6 is desirable in order to avoid unduly slow reaction and usually it is advantageous to maintain a pH of at least 7 and more advantageously at least 7.5 in the reaction mixture throughout the reaction. Excessively high pH is to be avoided since it tends to favor formation of undesirable byproduct. For this reason it is generally desirable to operate at a pH not greater than about 12 and more preferably at not above 10. Excellent results can be obtained when controlling the addition of basic agent so as to maintain the pH in the range of about 7.5 to about 9. It is one of the advantages of the new process that only very small amounts of basic agent are required to maintain the desired pH. The pH as here referred to is that determined with standard pH indicator paper which has been premoistened with distilled water when measuring the pH of substantially non-aqueous mixtures.

The reaction is exothermic and usually relatively rapid. The temperature of operation is not highly critical. Temperatures in the range of about 0° to about 100° C. can be employed advantageously, although temperatures of the order of about 20° to about 50° will usually be preferred. The higher the reaction temperature the shorter the reaction time which should be used for best results. Thus whereas times as long as about 24 hours or more may be used at about 0° C. or lower, less than 5 minutes' reaction time is desirable when the temperature is increased to 100° C. or higher. When using temperatures above the boiling point of one or both reactants it is preferred to operate under sufficient superatmospheric pressure to maintain the reactants at least partly in the liquid phase.

The new reaction can be carried out in a variety of different ways using batch, intermittent or continuous methods of operation. The reactants can be introduced in any convenient order. One method of batchwise reaction which has been found to be advantageous is to feed the alpha,beta-ethylenic ketone in the liquid phase into a solution of the chosen organic hydroperoxide epoxidizing agent in a stirred reactor provided with temperature control means to maintain the desired reaction temperature. Preferably cooling is used with a feed rate adjusted so as to maintain the temperature below about 40° C. It has been found convenient to simultaneously feed a solution of a basic agent into the reaction mixture through a separate feed line at a rate so as to maintain the pH in the mixture within the chosen limits during the reaction. It is feasible, however, to add part or all of the basic agent to the organic hydroperoxide solution at the start of the reaction in this method of operation. Basic acting salts such as sodium bicarbonate, lithium phenoxide, etc. are especially siutable for maintaining the desired pH in this way. Alternatively one can charge only a portion, say about 5% to about 15%, of the organic hydroperoxide to the reactor initially and then feed in alpha,beta-ethylenic ketone and organic hydroperoxide separately in approximately stoichiometric proportions while maintaining the required pH as previously indicated until a reactor charge has been completed.

An alternative method of batchwise reaction is to add the chosen base to a stirred solution of the alpha-beta-ethylenic ketone and organic hydroperoxide in a suitable solvent of the previously indicated type, using the above described type of reactor.

The process can be carried out continuously in apparatus of the foregoing type, for example, by partially reacting an initial charge of organic hydroperoxide as described above, then continuously adding alpha,beta-ethylenic ketone and a stream of organic hydroperoxide separately to the reactor with continuous or intermittent addition of base in the required amount while continuously or intermittently withdrawing epoxyketone-containing reacted mixture from the reactor. The same result can be obtained, usually more advantageously, by using as the reactor a cooler with or without a time tank in series therewith and employing a pump to circulate reaction mixture therethrough as a continuously circulating stream into which the alpha,beta-ethylenic ketone, hydroperoxide and basic agent are continuously fed at separate points sufficiently separated from the point of withdrawal of reaction mixture that substantial reaction is achieved before removal of the product-containing mixture from the reactor. Alternatively, the alpha,beta-ethylenic ketone can be fed at spaced points along the path of flow of the reaction mixture through a tubular or other suitable form of reactor in which the proper temperature is maintained. Temperature control can be achieved by external cooling or evaporation of a volatile component of the mixture, for instance, a liquefied gaseous hydrocarbon such as butane or isopentane, which can also serve at least in part as the solvent and/or diluent for the reactants, the pressure of the system being regulated so that this volatile component will evaporate at the chosen reaction temperature. As in the previously described modification of the process, hydroperoxide and/or a solution of the base being used can be fed, preferably separately, into the stream of reaction mixture at intermediate points between the points of alpha,beta-ethylenic ketone feed.

The epoxyketone produced can be recovered from the reaction mixture in any suitable manner, account being taken of the reactive nature of these compounds, especially the tendency of the epoxide ring to undergo hydration in aqueous media, slowly under neutral conditions and more rapidly under acidic or basic conditions. One suitable method of recovering the alpha,beta-epoxyketone product is by distillation, preferably flash distillation under approximately neutral conditions, using reduced pressure, preferably at a temperature below 100° C., more preferably at between about 50° C. and about 60° C. The time of exposure of the epoxyketone to elevated temperatures should be shorter the higher the temperature in order to minimize reactions, particularly hydration of the epoxy group when aqueous mixtures are being treated. The flashed epoxyketone will usually be found to be quite stable after this removal from the salts and can be advantageously used as recovered in aqueous solution or can be isolated in pure or substantially pure form.

Other methods of recovery such as extraction with ether or the like can also be used. Where the epoxyketone produced is desired as an intermediate for further synthesis, it is often advantageous to use the epoxidation mixture for this purpose without isolating the epoxyketone therefrom and such use will constitute recovery of the product. For example, where the epoxyketone is to be converted to the corresponding dihydroxy-ketone by hydration of the epoxy group, the hydration can be carried out successfully without flashing off the epoxyketone from the epoxidation mixture. The hydration can be effected under alkaline, neutral or acid conditions. A substantial excess of water is desirable for the hydration and advantageously the reaction is carried out at epoxyketone concentrations of about 5 to about 25% by weight. Sufficient water may be present in the epoxidation mixture but it will usually be advantageous to add additional water. Heating the neutralized epoxidation mixture at 60° C. to 100° C. has been found to be the suitable method. Higher yields are generally obtained, however, by reaction with water under acid conditions, most preferably at a pH of about 0.5 to about 1.0. Although longer reaction times are required it is usually advantageous to carry out the acid hydration at a temperature of about 50° C. or below, most preferably at about room temperature, when using the epoxidation mixture for the reaction since higher yields can be obtained in this way. Under these preferred conditions the hydration can be completed in about 3 to about 24 hours and high yields of alpha, beta-dihydroxyketones can be obtained. The alpha,beta-dihydroxyketones which are thus produced can be hydrogenated to the corresponding polyhydroxyhydrocarbons by reaction with hydrogen in the presence of a hydrogenation catalyst. The epoxyketone products can be converted to other useful derivatives via reaction of the epoxy group and/or keto group and any such reaction can be employed for recovery in the process of the invention.

The following examples further illustrate ways of carrying out the new epoxidation process and show some of its advantages.

EXAMPLE I

Epoxidation of Mesityl Oxide

To a stirred solution of tert-butyl hydroperoxide (15 ml., 0.135 mole) and mesityl oxide (22.6 ml., 0.20 mole) in 100 ml. benzene at 15° was added 2.88 grams of a 35% methanolic solution of Triton-B (0.006 mole). After 5 hours stirring at room temperature, the mixture was washed with water. The aqueous washings were saturated with salt and extracted with ether. The combined organic layers were dried over anhydrous magnesium sulfate and carefully fractionated through a 60 x 0.7 cm. tantalum wire column. After removal of solvents and starting materials there was obtained 10.05 grams (65% yield) of the product. B.P. 67–68° (30 mm.), $n_D^{20}$ 1.4229. A sample was redistilled for analysis. B.P. 55° (17 mm.), $n_D^{20}$ 1.4232, $\nu_{max}$ 1718 (saturated carbonyl), 920, 877, and 835 cm.$^{-1}$ (epoxide). Analysis.—Calcd. for $C_6H_{10}O_2$: C, 63.13; H, 8.83. Found: C, 62.98; H, 8.72. The boiling point, refractive index and infrared spectrum of this product were identical with those of an authentic sample of 3,4-epoxy-4-methyl-2-pentanone prepared by the method of Bunton and Minkoff, J. Chem. Soc., 665 (1949).

When tert-butyl hydroperoxide (0.10 mole) was caused to react for 24 hours at 0° with mesityl oxide (0.10 mole) in 325 ml. of an aqueous solution containing sodium hydroxide (0.02 mole), there was obtained a 53% yield of 3,4-epoxy-4-methyl-2-pentanone. The infrared spectrum of this product indicated the presence of a small amount of hydroxyl-containing impurity.

EXAMPLE II

Epoxidation of Methyl Vinyl Ketone

To a stirred solution of tert-butyl hydroperoxide (10 ml., 0.09 mole) and methyl vinyl ketone (16.7 ml., 0.20 mole) in 200 ml. benzene maintained at ice-bath temperature was added 0.48 gram of a 35% methanolic solution of Triton-B (0.001 mole) in three portions over a period of 2 hours. The temperature was then allowed to rise to 15° and, after a total reaction time of 4½ hours, the benzene solution was washed with water. The aqueous washings were saturated with salt and extracted several times with ether. The combined organic layers were dried over anhydrous magnesium sulfate. After removal of the solvents through a 10-inch Vigreux column at 180 mm. pressure, the residue was fractionated through a 60 x 0.7 cm. tantalum wire column. A 49% yield of 3,4-epoxy-2-butanone was obtained which boiled at 71.5° at 77 mm. (46° at 30 mm.) and had $n_D^{19}$ 1.4228. $\nu_{max}$ 1718 (saturated carbonyl) 925 and 870 cm.$^{-1}$ (epoxide). Analysis.—Calcd. for $C_4H_6O_2$: C, 55.80; H, 7.03; mol. wt., 86.09. Found: C, 56.02; H, 7.18; mol. wt., 85.

EXAMPLE III

Epoxidation of Methyl Isopropenyl Ketone

To a stirred solution of tert-butyl hydroperoxide (10 ml., 0.09 mole) and methyl isopropenyl ketone (19.7 ml., 0.20 mole) in 175 ml. benzene maintained at ice-bath temperature was added 0.72 gram of a 35% methanolic solution of Triton-B (0.005 mole) in three portions over a period of ½ hour. The reaction mixture was then allowed to warm to room temperature. After approximately 10 hours, the reaction mixture was worked up in the manner described above. The 3,4-epoxy-3-methyl-2-butanone product (6.25 grams, 69% yield) boiled at 54° (44 mm.) and had $n_D^{19}$ 1.4193. $\nu_{max}$ 1721 (saturated carbonyl), 922 and 842 cm.$^{-1}$ (epoxide). Analysis.—Calcd. for $C_5H_8O_2$: C, 59.98; H, 8.05; mol. wt., 100.11. Found: C, 60.16; H, 8.00; mol. wt., 99.

EXAMPLE IV

Epoxidation of Cyclohexen-3-one

To a stirred solution of cyclohexen-3-one (9.6 grams, 0.10 mole) and tert-butyl hydroperoxide (15 ml., 0.135 mole) in 80 ml. benzene was added at 10° 0.96 gram of a 35% methanolic solution of Triton-B (0.002 mole). The reaction was allowed to proceed for 12 hours at room temperature before it was worked up in the usual manner. The 2,3-epoxycyclohexanone product (7.42 grams, 66% yield) boiled at 74° (11 mm.) and had $n_D^{22}$ 1.4736. This material was redistilled for analysis. B.P. 76–78° (15 mm.), $n_D^{20}$ 1.4742, $\nu_{max}$ 1718 (saturated carbonyl) and 822 cm.$^{-1}$. Analysis.—Calcd for $C_6H_8O_2$: C, 64.27; H, 7.19; mol. wt., 112.12. Found: C, 64.42; H, 7.24; mol. wt., 112.

EXAMPLE V

Epoxidation of Chalcone

Chalcone (10.41 grams, 0.05 mole), tert-butyl hydroperoxide (7.5 ml., 0.068 mole) and a 35% methanolic solution of Triton-B (0.72 gram, 0.0015 mole) were dissolved in 80 ml. benzene at 10°. After being stirred for 5 hours at room temperature, the benzene solution was washed with water. The aqueous washings were saturated with salt and extracted with ether. The combined organic layers were dried over anhydrous magnesium sulfate and the solution was evaporated to dryness. A 95% yield of white, solid trans-chalcone oxide, M.P. 83–85°, was obtained. Crystallization from a benzene-petroleum ether (B.P. 60–68°) solution gave crystals which melted at 88.5–89.5°. $\nu_{max}$ 1686 (conjugated carbonyl) and 893 cm.$^{-1}$ (epoxide). Analysis.—Clcd. for $C_{15}H_{12}O_2$: C, 80.33; H, 5.39; mol. wt., 224.25. Found: C, 80.33; H, 5.44; mol. wt., 224.

The foregoing examples are merely illustrative and the present invention broadly comprises reacting an alpha, beta-ethylenic ketone with an organic hydroperoxide in the presence of a base and recovering the alpha,beta-epoxyketone which is produced. Specific alpha,beta-ethylenic ketones, other than those used in the example, which can be converted to the corresponding alpha,beta-epoxyketones by the new process, include aliphatic ketones, typical of which are ethyl vinyl ketone, hexen-3-one-2

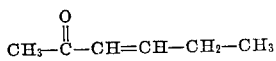

decen-4-one-6 and the like, and alpha,beta-ethylenic cyclic hydrocarbon ketones such as 4-methylcyclohexen-2-one, vinyl cyclohexyl ketone, vinyl cyclohexenyl ketone, Δ'-menthene-6-one, etc. Suitable starting ketones of these types are described, together with methods for their production, in U.S. Patent 2,246,032 for instance. Representative alpha,beta-ethylenic aromatic ketones which can be similarly epoxidized include vinyl phenyl ketone, benzalacetone, 2,4-dimethylseneciophenone, dibenzalacetone, etc.

Ketones having more than one ethylenic group in the molecule can also be used in the new process. Those having a plurality of ethylenic groups which are alpha,beta to the ketone carbonyl group or groups will yield polyepoxides, and when such products are desired one should use at least one mole of organic hydroperoxide epoxidizing agent per ethylenic group which is to be epoxidized. In this way divinyl ketone gives 1,2,4,5-diepoxypentanone-3, diisopropenyl ketone gives 2,4-dimethyl-1,2,4,5-diepoxypentanone-3, 1,5-hexadienedione-3,4 gives 1,2,5,6-diepoxyhexadione-3,4, and phorone gives 2,6-dimethyl-2,3,5,6-diepoxyheptanone-4. When using alpha,beta-ethylenic ketones having a multiple linkage between carbon atoms further removed from the carbonyl carbon atom, it is a feature of the new process of the invention that the ethylenic linkage alpha,beta to the ketone carbonyl group is selectively epoxidized giving unsaturated epoxyketones which are valuable new compounds otherwise difficult to synthesize. Thus from vinyl allyl ketone and Δ⁸-heptadecenyl vinyl ketone there are obtained 1,2-epoxyhexen-5-one-3 and 1,2-epoxyeicosen-8-one-3, respectively. In general, alpha,beta-ethylenic ketones having 4 to about 30 carbon atoms per molecule, especially good results being obtained with alpha,beta-ethylenic hydrocarbon ketones of 4 to 10 carbon atoms. The new process of this invention is of particular value in the expoxidation of alpha,beta-ethylenic aliphatic hydrocarbon ketones of 4 to 10 carbon atoms per molecule and of alpha,beta-ethylenic cyclic hydrocarbon ketones, especially alicyclic hydrocarbon ketones having 6 to 30 carbon atoms. While hydrocarbon ketones are especially advantageous starting materials for the new process one can also successfully epoxidize in the same way alpha,beta-ethylenic ketones which contain substituents on carbon atoms other than those to which the alpha,beta-ethylenic double bonds are attached, which carbon atoms should be directly linked only to carbon and/or hydrogen atoms.

Organic hydroperoxides which can be used as the epoxidizing agent instead of the hydroperoxides of the foregoing examples include, for instance: chloro-tertiary butyl hydroperoxide, para-menthane hydroperoxide, tertiary amyl hydroperoxide, lauryl hydroperoxide, benzyl hydroperoxide, cyclohexyl hydroperoxide, cyclohexene hydroperoxide, bromo-tertiary butyl hydroperoxide, eicosyl hydroperoxide, and 1,1-dichloromethylpropyl hydroperoxide. Hydroperoxides containing not more than about 20 carbon atoms are of the molecule size preferred in the process of the invention.

A particularly suitable class of hydroperoxides, for employment in the process of the invention, consists of the tertiary hydrocarbon peroxides and their halogen-analogs containing one or more chlorine or bromine atoms. This class includes, for example, such substituted or unsubstituted tertiary alkyl hydroperoxides as tertiary butyl hydroperoxide, alpha,alpha-dimethylbenzyl hydroperoxide, chlorotertiary butyl hydroperoxide, 1-chloromethyl-1-bromomethylpropyl hydroperoxide as well as 1-methyl-cyclohexyl hydroperoxide. However, U.S. Patent 2,831,-023 and the references cited therein describe secondary hydroperoxides of the formula

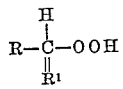

wherein R and R¹ each represents an acyclic hydrocarbon radical containing 1 to 24 carbon atoms and the total number of carbon atoms in R and R¹ does not exceed 24 which can also be used as can other hydroperoxides from non-acidic starting compounds such as methyl ethyl ketone, etc.

The alpha,beta-epoxy ketones made available by the new process are valuable compounds. In addition to their use as intermediates in the manufacture of polyols having numerous established applications by hydration and hydrogenation, for example, they are useful for other purposes. They can be reacted with polycarboxylic acids or polyhydric alcohols at the epoxy group to form resinous polyesters and polyethers which can be cured by cross-linking through the ketone groups in making surface coatings, moldings and castings. It will therefore be seen that the invention offers many advantages. It is not restricted to the examples which have been given by way of illustration, nor by any theory proposed in explanation of the improved results which are attained.

We claim as our invention:

1. In a process for producing alpha,beta-epoxyketone by epoxidizing the corresponding alpha,beta-ethylenic ketone of 4 to 30 carbon atoms per molecule composed only of carbon, hydrogen and oxygen atoms, the improvement which comprises reacting said alpha,beta-ethylenic ketone with a hydroperoxide of 1 to 20 carbon atoms per molecule composed only of carbon, hydrogen and oxygen atoms while maintaining the pH of the reaction mixture in the range of about 6 to about 10, and recovering the resulting alpha,beta-epoxyketone.

2. A process in accordance with claim 3 wherein the reaction is carried out by passing the reactants through a bed of solid quaternary ammonium hydroxide anion exchange resin.

3. In a process for producing alpha,beta-epoxyketone by epoxidizing the corresponding alpha,beta-ethylenic ketone of 4 to 30 carbon atoms per molecule composed only of carbon, hydrogen and oxygen atoms, the improvement which comprises reacting said ethylenic ketone with a hydroperoxide of the group consisting of tertiary butyl hydroperoxide, chloro-tertiary butyl hydroperoxide, para-menthane hydroperoxide, tertiary amyl hydroperoxide, lauryl hydroperoxide, benzyl hydroperoxide, cyclohexyl hydroperoxide, cyclohexene hydroperoxide, bromo-tertiary butyl hydroperoxide, eicosyl hydroperoxide, 1,1-dichloromethylpropyl hydroperoxide, alpha,alpha-dimethylbenzyl hydroperoxide; 1-chloromethyl-1-bromomethylpropyl hydroperoxide; 1-methylcyclohexyl hydroperoxide, methyl ethyl ketone hydroperoxide and secondary hydroperoxides of the formula

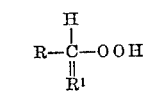

wherein R and R¹ each represent an acyclic hydrocarbon radical containing 1 to 24 carbon atoms and the total number of carbon atoms in R and R¹ does not exceed 24, in mole proportions of about 0.25:1 to about 4:1 at about 0° C. to about 100° C. while maintaining the reaction mixture at a pH between about 6 and about 10 and recovering the alpha,beta-epoxyketone product of the reaction.

4. A process in accordance with claim 3 wherein the peroxide is cumene hydroperoxide.

5. A process in accordance with claim 3 wherein the peroxide is a tertiary alkyl hydroperoxide having 4 to 20 carbon atoms per molecule.

6. A process in accordance with claim 5 wherein the hydroperoxide is tertiary butyl hydroperoxide.

7. A process in accordance with claim 3 wherein mesityl oxide is epoxidized.

8. A process in accordance with claim 3 wherein chalcone is epoxidized.

References Cited in the file of this patent

UNITED STATES PATENTS

| | | |
|---|---|---|
| 2,431,718 | Wilder et al. | Dec. 2, 1947 |
| 2,720,530 | Patrick | Oct. 11, 1955 |
| 2,776,301 | Payne et al. | Jan. 1, 1957 |
| 2,831,023 | Kahler et al. | Apr. 15, 1958 |

FOREIGN PATENTS

| | | |
|---|---|---|
| 395,435 | Germany | May 19, 1924 |

OTHER REFERENCES

Wasserman et al.: J. Am. Chem. Soc., volume 77, Feb. 5, 1955, pages 590–594.

Nachod: Ion Exchange Technology (1956), pages 24, 25 and 279, Academic Press Inc., New York.